US009591803B1

United States Patent
Covington et al.

(10) Patent No.: US 9,591,803 B1
(45) Date of Patent: Mar. 14, 2017

(54) DECK SUSPENSION SYSTEM FOR LAWNMOWER

(71) Applicants: Charles Bradley Covington, Batesville, AR (US); Warren Long, Batesville, AR (US)

(72) Inventors: Charles Bradley Covington, Batesville, AR (US); Warren Long, Batesville, AR (US)

( * ) Notice: Subject to any disclaimer, the term of this patent is extended or adjusted under 35 U.S.C. 154(b) by 0 days.

(21) Appl. No.: 14/735,677

(22) Filed: Jun. 10, 2015

Related U.S. Application Data (60) Provisional application No. 62/010,661, filed on Jun. 11, 2014.

(51) Int. Cl.
*A01D 34/00* (2006.01)
*A01D 34/81* (2006.01)
*A01D 101/00* (2006.01)

(52) U.S. Cl.
CPC .......... *A01D 34/81* (2013.01); *A01D 2101/00* (2013.01)

(58) Field of Classification Search
CPC .............. A01D 34/74; A01D 34/662; A01D 2034/645; A01D 2101/00; A01D 2034/6843; Y10S 56/22; Y10T 403/95; Y10T 29/49927; Y10T 29/49948; Y10T 403/7067; F16G 11/12; F16B 7/06; F16B 33/002; F16B 39/12; F16B 39/36
USPC ..... 56/17.1, 15.9, DIG. 22; 403/46, 44, 103, 403/43; 29/526, 888.021
See application file for complete search history.

(56) References Cited

U.S. PATENT DOCUMENTS

| | | | | |
|---|---|---|---|---|
| 1,374,963 A | * | 4/1921 | Stevenson | F16G 11/12 403/308 |
| 3,239,930 A | * | 3/1966 | Violleau | B21K 1/56 29/516 |
| 3,368,828 A | * | 2/1968 | Engler | A01D 67/005 280/489 |
| 3,456,430 A | * | 7/1969 | Maloney | A01D 34/822 242/390.8 |
| 3,669,467 A | | 6/1972 | Dunlap et al. | 280/124 |
| 3,737,174 A | | 6/1973 | Hickman | 280/124 |
| 4,025,207 A | * | 5/1977 | Johnson, Jr. | F16B 7/06 403/103 |
| 4,310,717 A | | 1/1982 | Eastman et al. | 585/661 |
| 4,559,669 A | | 12/1985 | Bonzer et al. | 16/44 |
| 4,760,686 A | * | 8/1988 | Samejima | A01D 34/74 56/15.8 |
| 4,829,754 A | * | 5/1989 | Shimamura | A01D 34/662 56/15.9 |
| 4,854,112 A | * | 8/1989 | Holley | A01D 75/30 172/269 |
| 4,977,733 A | * | 12/1990 | Samejima | B62D 7/142 180/234 |

(Continued)

*Primary Examiner* — Árpád Fábián-Kovács
(74) *Attorney, Agent, or Firm* — Keisling & Pieper PLC; Trent C. Keisling (57) ABSTRACT

In a riding mower having a frame, a mower deck supported beneath the frame by a pair of turnbuckles with resilient polyurethane bushings and a source of motive power also supported on the frame. The frame is supported on forward and rear wheel assemblies with a supporting wheel. The turnbuckles are pivotally secured to the frame by downwardly depending tabs captivating a forward end with the trailing end secured to the deck with links with holes that slide on bolts extending from lift actuator arms.

2 Claims, 7 Drawing Sheets

(56) References Cited

U.S. PATENT DOCUMENTS

| | | | | |
|---|---|---|---|---|
| 5,280,695 A | | 1/1994 | Nunes, Jr. et al. | 56/6 |
| 5,337,543 A | * | 8/1994 | Kitamura | A01D 34/68 56/10.8 |
| 5,355,661 A | * | 10/1994 | Tomiyama | A01D 34/001 180/6.48 |
| 5,669,655 A | * | 9/1997 | Hammond | B60J 1/2011 296/165 |
| 5,765,957 A | * | 6/1998 | Connell | F16C 7/06 403/44 |
| 5,782,078 A | * | 7/1998 | Brantley | F16B 7/06 248/555 |
| 5,899,470 A | | 5/1999 | Heitzmann | 280/86.751 |
| 5,927,055 A | * | 7/1999 | Ferree | A01D 34/662 56/15.9 |
| 5,979,920 A | | 11/1999 | Krakowiak et al. | 280/124.175 |
| 6,062,333 A | | 5/2000 | Gordon | 180/311 |
| 6,105,349 A | | 8/2000 | Busboom et al. | 56/14.7 |
| 6,170,242 B1 | | 1/2001 | Gordon | 56/15.8 |
| 6,460,318 B1 | | 10/2002 | Ferris et al. | 56/15.8 |
| 6,588,188 B2 | * | 7/2003 | Dennis | A01D 34/74 56/14.9 |
| 6,609,575 B1 | * | 8/2003 | Crabb | A01B 59/004 172/439 |
| 6,769,496 B2 | * | 8/2004 | Casali | A01B 59/041 172/439 |
| 6,837,032 B1 | * | 1/2005 | Swartzendruber | A01D 34/64 56/14.9 |
| 6,854,252 B2 | | 2/2005 | Foster | 56/320.1 |
| 7,013,626 B1 | * | 3/2006 | Strope | A01D 34/68 56/15.8 |
| 7,185,556 B2 | * | 3/2007 | Beattie | B60G 7/003 29/516 |
| 7,318,311 B2 | * | 1/2008 | Wright | A01D 34/74 56/17.1 |
| 7,325,388 B2 | * | 2/2008 | Wright | A01D 34/74 56/17.1 |
| 7,451,586 B1 | * | 11/2008 | Papke | A01D 34/662 56/15.9 |
| 7,520,114 B2 | * | 4/2009 | Bergsten | A01D 42/08 56/14.7 |
| 7,540,134 B1 | * | 6/2009 | Reich | A01D 34/74 56/14.9 |
| 7,587,886 B1 | * | 9/2009 | Sugden | A01D 34/661 56/14.9 |
| 7,708,292 B2 | | 5/2010 | Foster | 280/124.117 |
| 8,104,552 B2 | * | 1/2012 | Papke | A01D 34/82 180/19.3 |
| 8,353,639 B2 | * | 1/2013 | Kelly | F16B 7/06 403/46 |
| 8,438,822 B2 | * | 5/2013 | Lancaster | A01D 34/74 56/17.1 |
| 8,506,199 B2 | * | 8/2013 | Rump | B25B 13/02 280/124.153 |
| 9,103,405 B2 | * | 8/2015 | Smetz | F16G 3/006 |
| 2001/0037634 A1 | * | 11/2001 | Schick | A01D 34/64 56/15.9 |
| 2002/0059788 A1 | * | 5/2002 | Velke | A01D 34/64 56/14.7 |
| 2002/0108363 A1 | * | 8/2002 | Bergsten | A01D 34/81 56/16.7 |
| 2002/0194826 A1 | * | 12/2002 | Schick | A01D 34/662 56/15.9 |
| 2006/0237240 A1 | * | 10/2006 | Crumly | A01D 34/6806 180/6.48 |
| 2008/0229725 A1 | * | 9/2008 | Shaffer | A01D 34/74 56/17.1 |
| 2008/0245044 A1 | * | 10/2008 | Shick | A01D 34/74 56/14.9 |
| 2009/0173052 A1 | * | 7/2009 | Swart | A01D 34/74 56/15.2 |
| 2014/0083070 A1 | * | 3/2014 | Berglund | A01D 34/74 56/14.7 |
| 2015/0050122 A1 | * | 2/2015 | Gutta | F16B 7/06 415/12 |

* cited by examiner

DECK SUSPENSION SYSTEM FOR LAWNMOWER

CROSS-REFERENCE TO RELATED APPLICATIONS

This application claims priority to and is a continuation of U.S. application Ser. No. 62/010,661 filed on Jun. 11, 2014 entitled DECK SUSPENSION SYSTEM FOR LAWNMOWER. Each of these applications is hereby expressly incorporated by reference in their entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates generally to riding mowers and, more particularly, to an improved deck suspension system for mowers or the like. Known art can be found in U.S. Class 56, subclass 320 and in other classes and subclasses.

2. Description of the Known Art

Those skilled in the art will appreciate that riding mowers have been a staple for maintaining residential yards, commercial lawns, golf courses and highway rights of way for many years. They are seen moving along grass in many settings including grassy center dividers and along the sides of roads in rough, sometimes rocky terrain, and in all sorts of attitudes from flat and level to severe side hills.

In many instances, as an operator mows a particular area rough or rocky ground is often encountered and riding mower decks have been traditionally suspended beneath the mower to "float over" to permit movement of the mowing deck relative to the vehicle so that the vehicle can move past such obstructions. Many of these known devices use chains or cables or another similar suspension tactics that primarily rely upon the weight of the deck to suspend and orient it beneath the mower. A problem often encountered when mowing is that the deck is deflected when an obstruction is struck and then the deck fails to properly return to its normal mowing orientation and/or height relative to the mower. Another problem is that the deck is deflected too much and leaves a large area unmowed, which area then requires additional attention.

For example, our previous U.S. Pat. No. 6,854,252 used a chain system to suspend the mowing deck. While this system is generally satisfactory, it could be improved with a system that suspended the deck more definitively.

Known art which may be relevant to the present invention includes the following patents with their abstracts, the teachings of which are incorporated by reference.

U.S. Pat. No. 6,105,349 issued on Aug. 22, 2000, to Busboom, et al., titled Riding lawn mower having a liquid-cooled engine shows a lawn mower including a liquid-cooled engine having a radiator grille positioned over the radiator thereof. The radiator grille includes a perforated screen member having a series of alternating grooves and ridges formed therein which run downwardly and rearwardly from the forward end of the screen member. The design of the screen member and the radiator grille permit the perforated screen member to self-clean and also provides a convenient means by which the screen member may be manually cleaned, if necessary. This mower uses a chain suspension system for its mowing deck.

U.S. Pat. No. 6,062,333 issued on May 16, 2000, to Gordon titled Riding mower with pivoting front wheel assembly shows a riding mower or other like four-wheel vehicle has the two front wheels mounted off the cantilever end of a subframe which is pivotably attached to the underside of the main frame of the vehicle by two spaced part pivots lying along the vehicle length axis. A cutter deck is suspended from the main frame beneath the subframe. The subframe construction resists bending forces, due to front-to-back and vertical forces on the dropped-down front wheels, when they encounter obstacles or depressions. The main frame is made of steel tubing, and provides a generally rectangular space just forward of the driver's seat, suitable for placement of the driver's feet. Preferably, the subframe also has a generally rectangular opening, nominally aligned with the main frame opening, to also accommodate the driver's feet. The elevation of the driver's seat can thus be desirably lowered, to maintain a low center of gravity. This mower uses a chain suspension system for its mowing deck.

U.S. Pat. No. 5,280,695 issued on Jan. 25, 1994, to Nunes, Jr., et al. titled Wide area lawnmower shows a wide area mower which can be attached to and detached from a tractor in a relatively short time. In one disclosed embodiment, the mower has a main frame which is detachably connected to the rear mount of a tractor, swing frames pivotally connected to the main frame for movement into and out of engagement with the side mounts of the tractor, means detachably locking the swing frames in engagement with the side mounts, and mowing heads mounted on the frames to the sides and rear of the tractor. In another disclosed embodiment, the mower includes a frame adapted for connection to a towing vehicle, a pair of side decks positioned on opposite sides of the frame, a center deck positioned between the side decks, a pair of rear decks positioned to the rear of and between the side decks and the center deck. Ground engaging wheels at the front and rear of each deck support the decks, with the wheels at the rear of the side decks and the center deck being aligned with the wheels at the front of the rear decks, and means pivotally mounting the decks to the frame so that the decks can follow the contour of the ground. This device relies upon the small wheels on the mower decks to support the mower decks, which are undesirable since they place the weight of the deck on the ground and do not transfer the mowing deck weight to the larger wheels of the mower itself.

Also, commercially available equipment and components may be relevant, including hollow metal frames, shoe brushes and the like. Such equipment may be used in implementing an exemplary embodiment in accordance with the present invention.

None of these references, either singly or in combination, disclose or suggest the present invention. It is desirable to have a improved lawnmower to address the perceived shortcomings of the known art.

While it is evident from past attempts that suspension systems for lawnmowers are desirable, the known art is limited in its teaching and utilization, and an improved system is needed to overcome these limitations. An improved suspension system should provide a simple and efficient system for meeting the various needs of the users and the like.

SUMMARY OF THE INVENTION

The present invention addresses the perceived needs in the known art discussed above. In this regard, the present invention substantially fulfills this need. The deck suspension system for lawnmower may be advantageously used with zero-turn lawnmowers or others belly-mounted suspended decks and the like. The deck suspension system uses turnbuckles to control the deck deflection when contacting irregularities in the terrain traversed by the mower.

In one exemplary embodiment in accordance with the present invention an improved deck suspension system may be used with the mower to keep the deck substantially isolated from the frame of the lawnmower to thereby dampen vibrations or shocks transmitted to the operator as the vehicle traverses the ground.

The apparatus of the invention is capable of receiving additional, optional features which are not a part of the present invention. For example, a purchaser or user may specify an optional mulcher or bagger or the like for a lawnmower. Other optional features, some of which may be illustrated herein, may or may not be included with apparatus incorporating the basic aspects of present invention.

In addition to providing the features and advantages referred to above, it is an object of the present invention to provide an improved suspension system for lawnmower.

Another object of the present invention is to provide a lawnmower with a mowing deck that restricts the degree of deflection of the deck when an obstruction is encountered.

A basic object of the present invention is to provide a more stable lawnmower.

Yet another object of the present invention is to enhance user comfort.

A related object of the present invention is to provide a safer lawnmower.

These and other objects and advantages of the present invention, along with features of novelty appurtenant thereto, will appear or become apparent by reviewing the following detailed description of the invention in conjunction with the appended drawings.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

The present invention addresses the perceived needs in the known art discussed above. In this regard, the present invention substantially fulfills this need. The improved deck suspension system for lawnmower includes a vibration damping system and deflection system that definitively control mower deck position and orientation.

In one exemplary embodiment in accordance with the present invention and shown in FIGS. 1-10, an improved riding mower is illustrated. A commercial riding mower 20 is illustrated and is constructed in accordance with the present invention to move along terrain, irrespective of its attitude, presuming it is not too steep or ridiculously uneven to accommodate any such riding mower.

Figure 1:
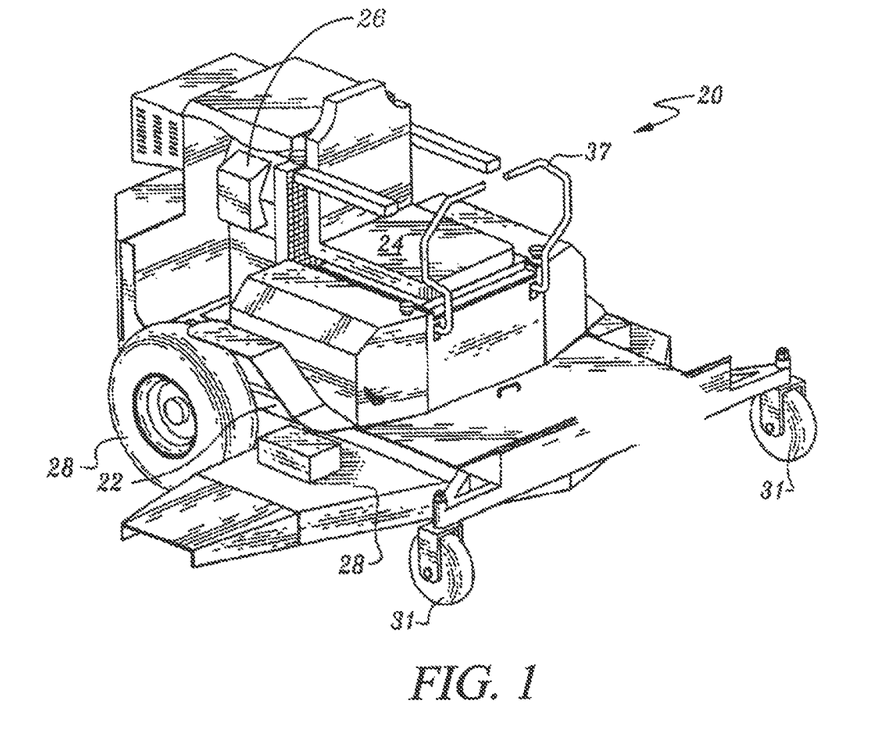
FIG. 1 is a perspective view of a riding mower in accordance with an embodiment of the present invention.
Figure 2:
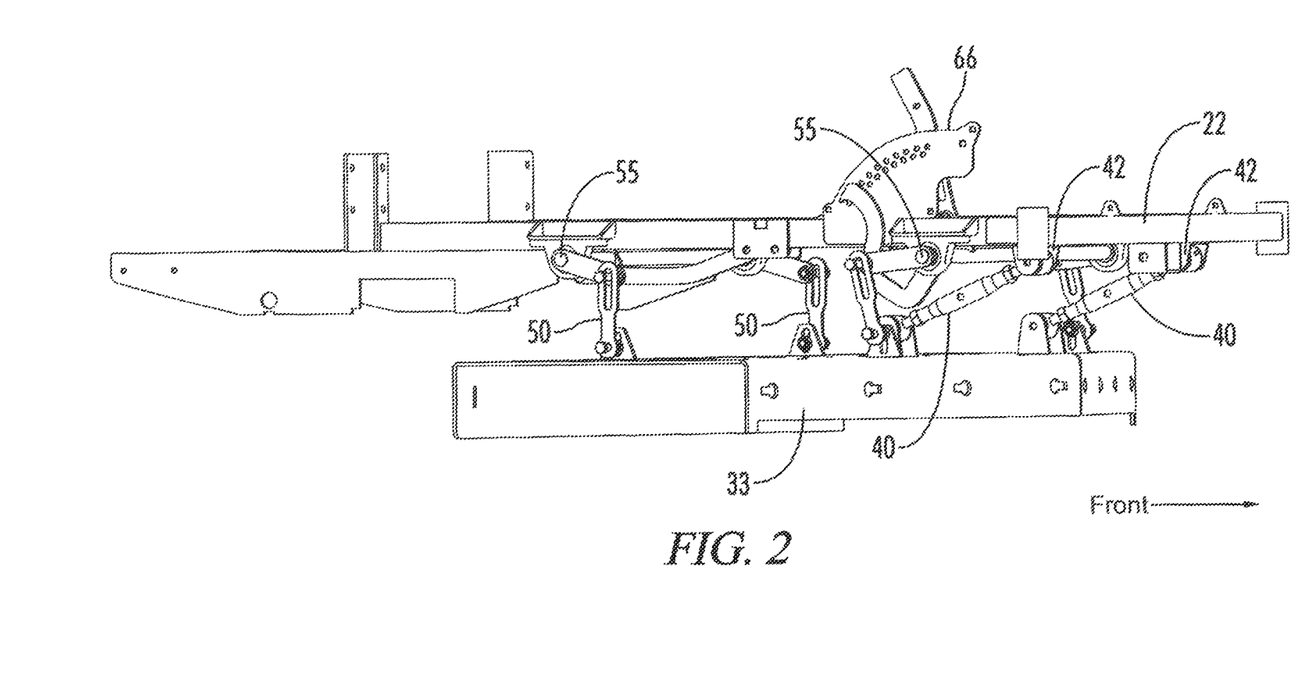
FIG. 2 is a perspective view of the frame of the mower frame with the mower deck shown suspended therefrom.
Figure 3:
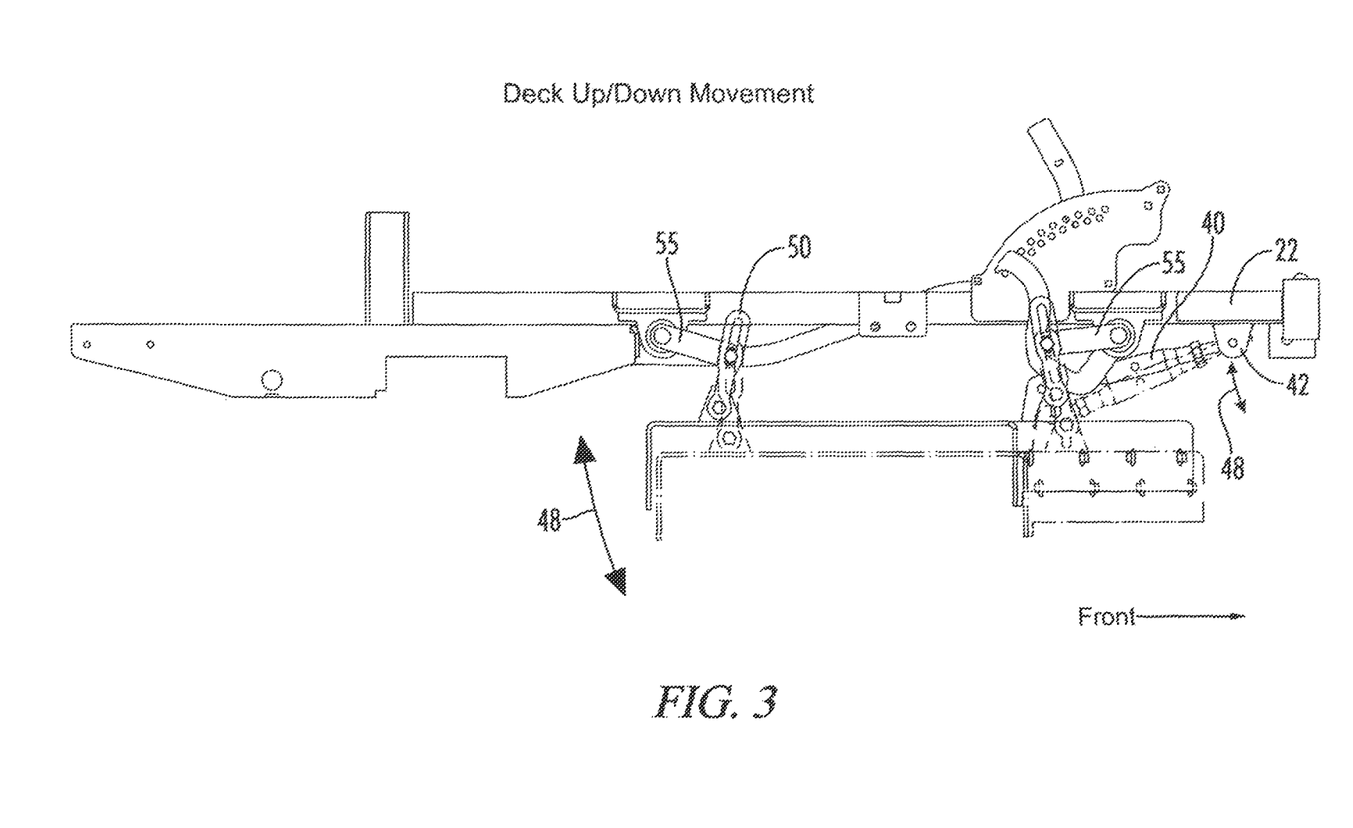
FIG. 3 is an elevational view taken from the side with the mower deck in a raised position and with the dashed lines depicting the mower deck in a lowered position.

The mower 20 comprises a chassis supported by a rigid frame 22 upon which a driver's seat 24 is situated approximately amidships of the mower and forward of an engine compartment 26. The frame is supported on drive wheels 28 mounted near the rear of the frame 22, and casters 31 at the forward end thereof to facilitate steerage.

A mowing deck 33 depends from the frame 22, which houses multiple rotary cutter units, not specifically illustrated in that they are one of several well known structures. The rotary cutting units are, in the illustrated case, belt driven, although other types of drives are within the purview of the invention. The mowing deck is height adjustable in order to permit the operator to set the cutting height in accordance with the terrain to be mowed.

The operator, or driver, not shown, is provided with conveniently located steering arms 37, which access a hydraulic drive system, again not specifically shown or described in that it is exemplary only and not germane to the invention. Similarly, and for the same reason, the power plant, comprising in this case a water cooled internal combustion engine again may be of differing types including gasoline, diesel and propane, the election of which is not particularly germane to the present invention.

A commercial riding mower of the type illustrated is an amalgamation of several systems, including the power plant and a fuel storage and feed system therefor, a hydraulic system, multiple drive systems for the rotary cutters, drive and steering system for the drive wheels, and where, as is the case here, the engine, is water cooled, a cooling system. All of these systems are typically encased to a greater or lesser extent within several integrated protective coverings, which, in addition to providing a substantial safety element for the driver and those working around the machine as it operates, such covering adds structural strength to the unit itself.

It is a feature of the present invention that a deck suspension system is provided with vibration damping capability. Referring to FIGS. 2-10, the mowing deck 33 is suspended from the mower frame 22 by two forwardly positioned turnbuckles 40 and with rear suspension links 50. The rear suspension links 50 permit the deck 33 to be raised and lowered by corresponding lift actuator bars 55, which may be manually, hydraulically or electrically actuated to raise and lower the deck 33 by the user. A height selector 60 controls the amount by which the deck 33 may be lowered.

Movement of the deck 33 is limited and vibration is dampened by the provision of turnbuckles 40 which are secured between the downwardly depending frame tabs 42 on the forward end of the frame 22 by a bolt or the like. The pivotal movement of each turnbuckle 40 is shown by arrow 48.

Figure 4:
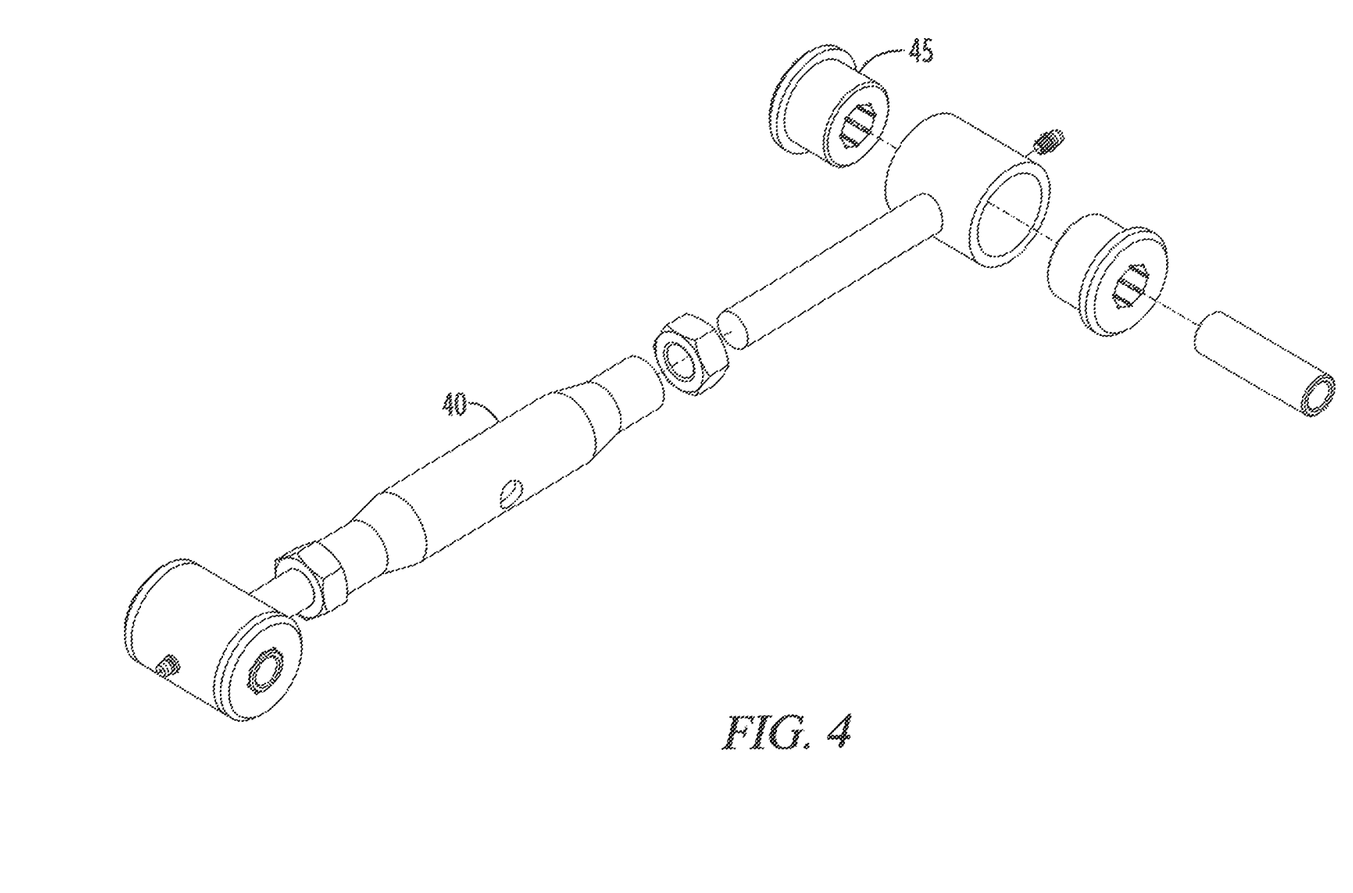
FIG. 4 is a partially exploded view showing a turnbuckle.
Figure 5:
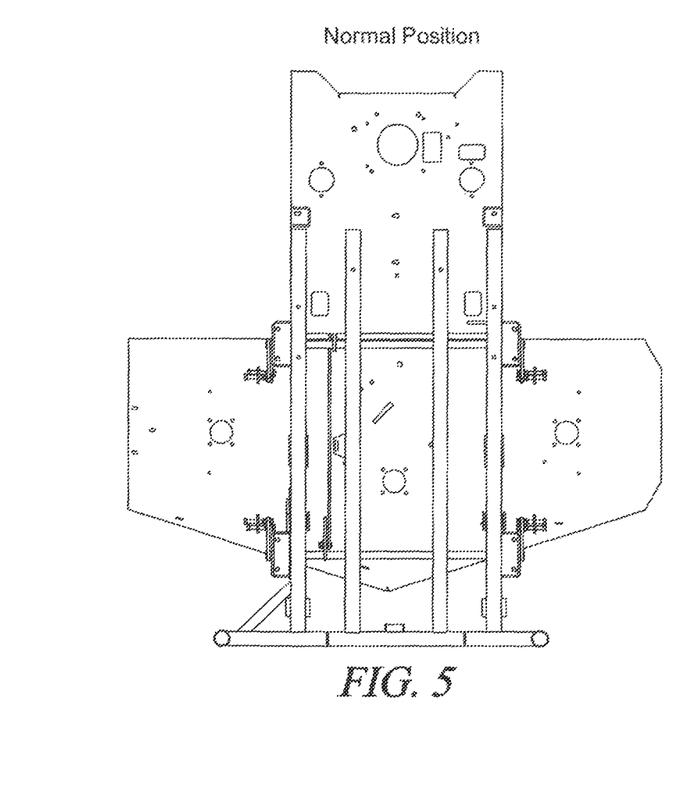
FIG. 5 is a top plan view of the frame with the mower deck suspended therefrom.
Figure 6:
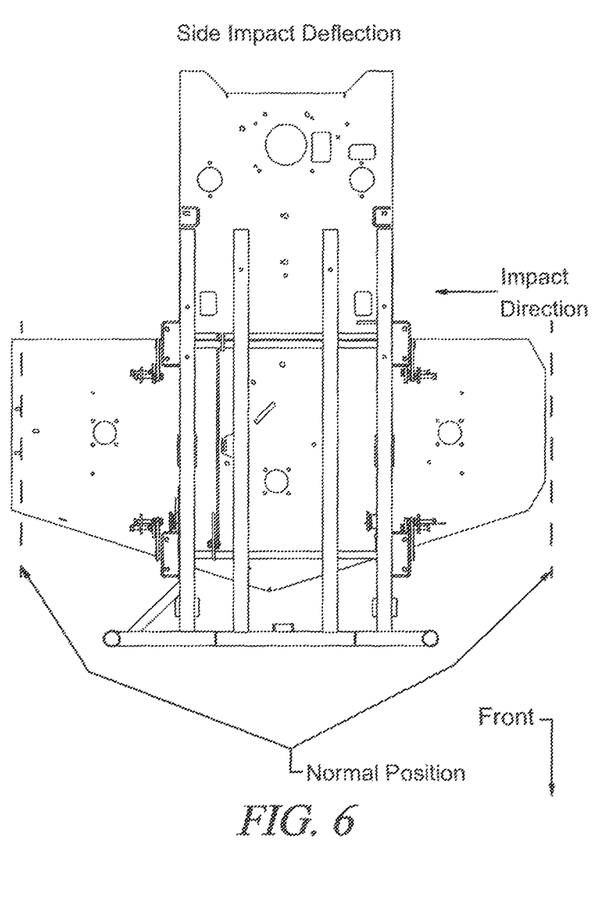
FIG. 6 is a top plan view of the frame with the mower deck suspended therefrom similar to FIG. 5 but showing the mower deck in a deflected position.
Figure 7:
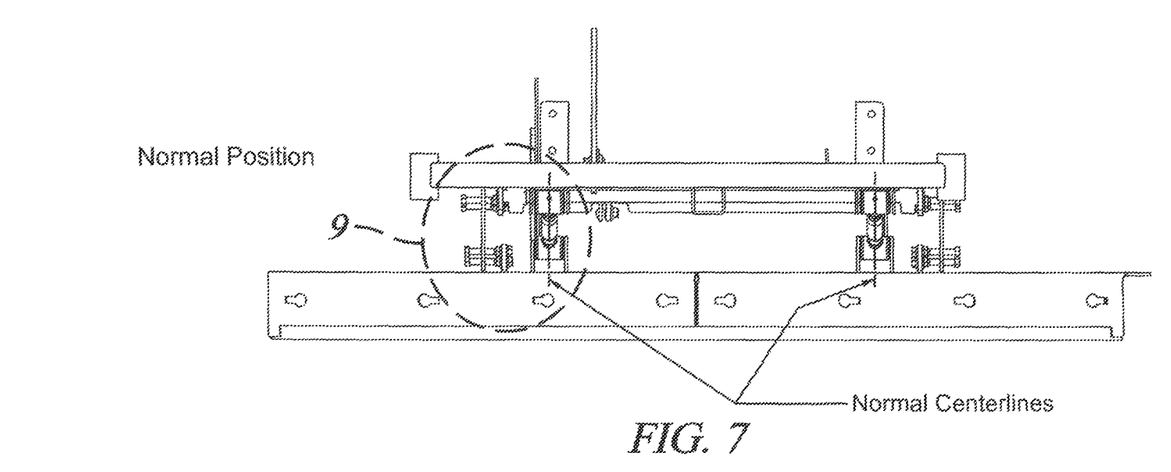
FIG. 7 is an elevational view taken generally from the front of the frame with the mower deck suspended therefrom.
Figure 8:
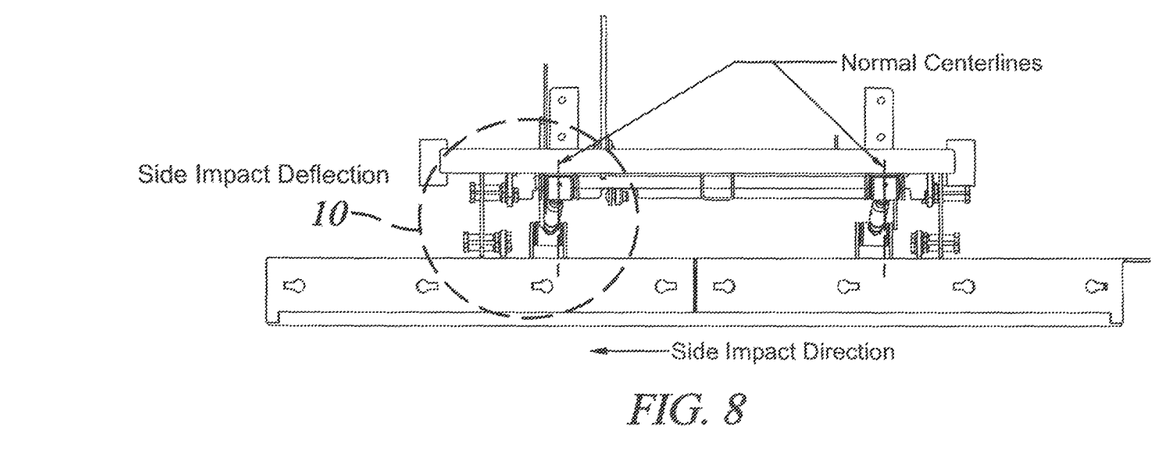
FIG. 8 is an elevational view taken generally from the front of the frame with the mower deck suspended therefrom similar to FIG. 7 but showing the mower deck in a deflected position.
Figure 9:
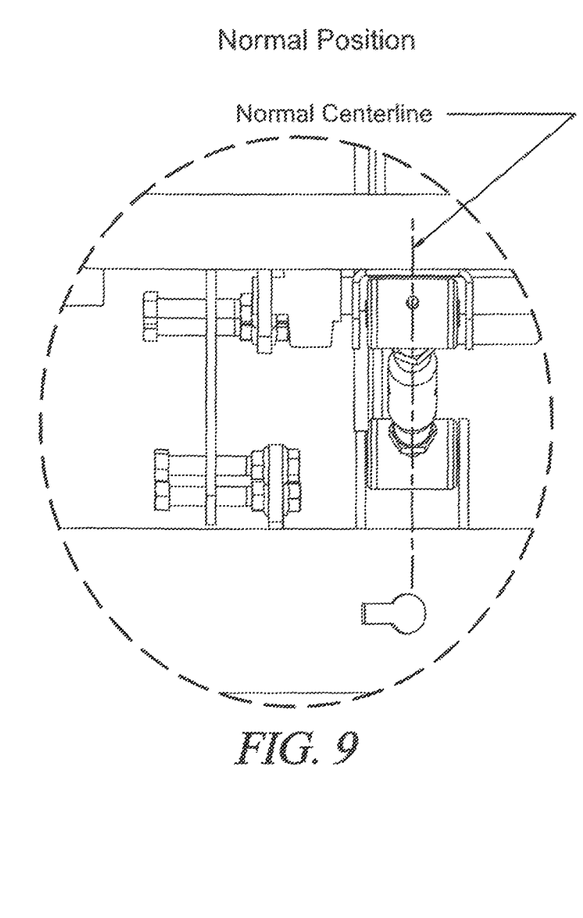
FIG. 9 is an enlarged elevational view of the encircled area in FIG. 7; and, FIG. 10 is an enlarged elevational view of the encircled area in FIG. 8.
Figure 10:
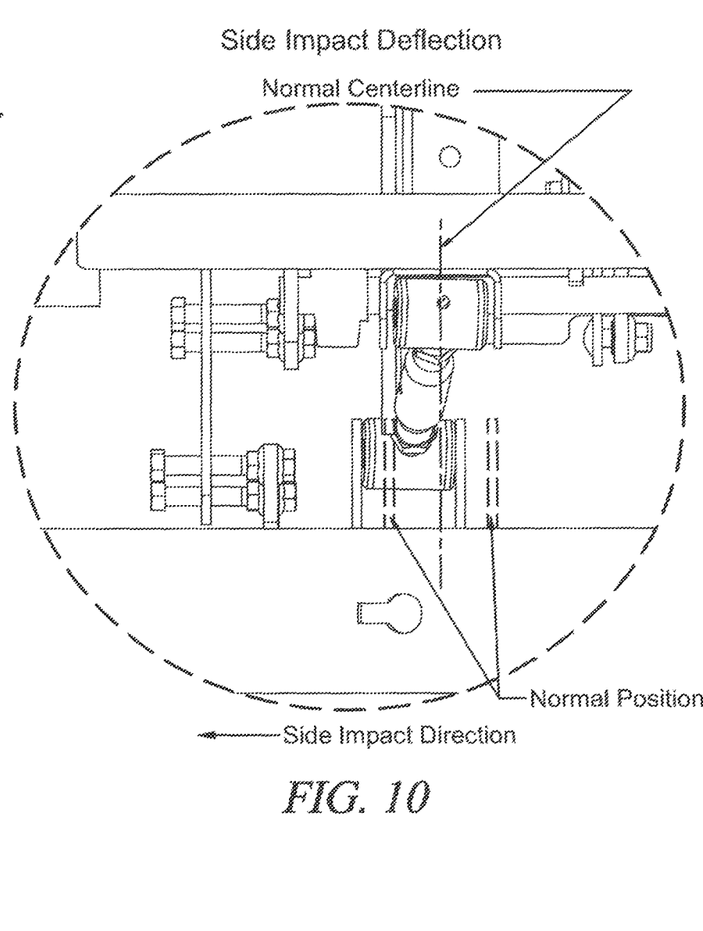

Each turnbuckle 40 is similar in construction. Each turnbuckle 40 includes a pair of polyurethane bushings 45 at each end of the turnbuckle to permit deflective movement of the mowing deck relative to the mower. The turnbuckle 40 is conventional in construction and permits the ends to be variably spaced apart by a threaded shaft and receptive sleeve with a locking nut in the conventional fashion.

Each polyurethane bushing 45 is really two separate bushings mounted inside the large outer steel sleeve at one turnbuckle end with a small inner steel sleeve inside the bushings through which a bolt may be inserted to mount the turnbuckle end. A grease fitting (zert) permits the greasing of the bushing to facilitate movement of the bushing pieces inside the outer sleeve and long the inner sleeve.

The amount of lateral deck movement is dependent upon the resilience of the respective turnbuckle and the length of the turnbuckle. These resilient bushings 45 provide a cushion between the mowing deck and the frame of the mower, thereby absorbing shock created when the mowing deck strikes an obstruction when moving over uneven terrain. The rear suspension links 50 use long bolts to permit lateral deck movement of up to a few inches while retaining rigidity.

The deflective movement of the deck is shown in FIGS. 5-10 as well. When the deck 33 strikes an obstruction, instead of deflecting away (as is the case with many conventional mower decks supported by chains or the like) the deck is biased against the obstruction to ride tightly against it and to in effect push against the wheels of the mower to absorb the shock of the impact.

The apparatus of the invention is capable of receiving additional, optional features which are not a part of the present invention. For example, a purchaser or user may specify an optional railing or grab bars may be included to facilitate handling of the device during deployment. Other optional features, some of which may be illustrated herein, may or may not be included with apparatus incorporating the basic aspects of present invention.

In describing a preferred embodiment of the invention illustrated in the drawings, specific terminology has been used for the sake of clarity. However, the invention is not intended to be limited to the specific terms selected, and it is to be understood that each specific term includes all technical equivalents which operate in a similar manner to accomplish a similar purpose.

What is claimed is:

1. A riding mower with forward and rear wheel assemblies supporting a frame having a source of motive power with a mowing deck supported beneath the frame by a deck suspension system that dampens deck vibrations transmitted to the riding mower, the deck suspension system comprising:
   at least two spaced apart, downwardly depending tabs secured proximate the frame front behind the forward wheel assemblies;
   at least two turnbuckles, each pivotally secured to the frame by each of the tabs, wherein each turnbuckle has resilient polyurethane bushings at spaced apart ends and wherein each tab captivates a forward turnbuckle end with the trailing turnbuckle end secured to the deck and wherein the resilient polyurethane bushings enable lateral deflective movement of the deck relative to the riding mower when the deck encounters an obstacle and wherein the lateral deflective movement is increasingly dampened by the resilient polyurethane bushings and whereby the resilient polyurethane bushings substantially dampens deck vibrations transmitted from the deck to the riding mower; and,
   several spaced apart lift actuator bars adapted to raise and lower the mowing deck in response to operator control.

2. The system as described in claim 1 wherein each of the lift actuator bars further comprises a link with an elongated hole that slides on rigid bolts mounted to the bars during lateral deck movements.

* * * * *